(12) United States Patent
Minarovic

(10) Patent No.: US 6,271,667 B1
(45) Date of Patent: Aug. 7, 2001

(54) BURIED CLOSURE GUARD WITH ELECTRONIC MARKER

(76) Inventor: Joe T. Minarovic, 201 Logan Ranch Rd., Georgetown, TX (US) 78628

( * ) Notice: Subject to any disclaimer, the term of this patent is extended or adjusted under 35 U.S.C. 154(b) by 0 days.

(21) Appl. No.: 09/417,960

(22) Filed: Oct. 13, 1999

Related U.S. Application Data

(63) Continuation-in-part of application No. 09/165,402, filed on Oct. 2, 1998, now Pat. No. 6,133,738.

(51) Int. Cl.$^7$ ............................... G01V 3/08; G01V 3/11; G08C 21/00; H01Q 1/04
(52) U.S. Cl. ......................... 324/326; 324/67; 116/209; 343/719
(58) Field of Search ............................ 324/67, 326–329; 342/459; 52/103; 116/209; 343/719; 340/551, 572.5, 572.7; 455/40; 379/25

(56) References Cited

U.S. PATENT DOCUMENTS

| | | | |
|---|---|---|---|
| 4,334,227 | * 6/1982 | Marks | 343/719 |
| 4,712,094 | * 12/1987 | Bolson, Sr. | 324/329 X |
| 4,781,958 | 11/1988 | Gilbert | 428/76 |
| 4,862,088 | * 8/1989 | Etienne et al. | 324/67 X |
| 4,947,012 | * 8/1990 | Minarovic | 324/326 X |
| 5,025,550 | 6/1991 | Zirbes et al. | 29/605 |
| 5,771,835 | * 6/1998 | Schneider | 116/209 |
| 5,825,303 | * 10/1998 | Bloss, Jr. et al. | 343/719 X |

FOREIGN PATENT DOCUMENTS

WO 98/35243   8/1998   (WO).

* cited by examiner

Primary Examiner—Gerard R. Strecker
(74) Attorney, Agent, or Firm—Skjerven Morrill MacPherson LLP; Jack V. Musgrove

(57) ABSTRACT

A device for electronically marking a buried closure has a transponder and a shield or cover affixed to the transponder in such a manner that, when attached to the buried closure, the transponder is positioned at a predetermined location and orientation with respect to the known position and orientation of the buried closure. The shield can have a raised portion housing the transponder, and is preferably elongated with an arcuate cross-section, generally larger than the buried closure.

15 Claims, 3 Drawing Sheets

BURIED CLOSURE GUARD WITH ELECTRONIC MARKER

CROSS-REFERENCE TO RELATED APPLICATION

This application is a continuation-in-part of U.S. patent application Ser. No. 09/165,402, filed on Oct. 2, 1998, now U.S. Pat. No. 6,133,738.

BACKGROUND OF THE INVENTION

1. Field of the Invention

The present invention generally relates to devices used to electromagnetically mark and locate obscured objects, and more particularly to a guard or shield adapted to physically protect and visually mark an obscured object, such as a buried closure, which also provides a transponder or marker to enable the later location of the buried closure.

2. Description of Related Art

Buried conduits are employed for supplying a wide variety of utilities, including pipelines for gas, water and sewage, and cables for telephone, optical fiber, power and television. It often becomes necessary to locate defective or damaged cables, pipes, etc., in order to repair or replace them. Conversely, it is important to know with as much accuracy as possible the approximate vicinity of such items in order to avoid disturbing them when digging or excavating for other purposes. Above-ground marking devices may be installed immediately after the conduit is buried, but they are often lost, stolen, or destroyed after a short period of use. Therefore, it is common to use underground marking devices or systems to enable the later location of a section or feature of an underground utility.

In the past, three different approaches have been used to indicate the presence of buried conduits, namely, warning tapes, trace wires, and electronic marker systems. A warning tape is simply a band of plastic which is placed above the conduit before burial. These tapes are used to alert the excavation team of the presence of the conduit before any damage thereto might occur. As the backhoe or other mechanical digger excavates the site, it will hopefully uproot a portion of the warning tape prior to contact with the conduit. The primary disadvantage of (non-metallic) warning tapes is that they cannot be detected by any surface instrumentation.

A single trace wire is sometimes buried with a utility line. The trace wire is used as a conductor for an AC signal which is applied to the wire at one accessible end, and then acts as an antenna and radiates an electromagnetic field above ground along its entire length. The electromagnetic field may be detected with an appropriate receiver, and the underground path of the line thereby determined. The earliest cable locators used a single sensor which detects a single null or peak (depending upon the orientation of the sensor) as the unit passes near the cable. Many later devices use two or more sensors that combine the signals to provide an indication of conductor proximity. The most common sensors are ferrite-core antennas, i.e., inductors. Although the conduit itself may act as a conductor (i.e., when steel pipe or copper wire cabling is used), most conduits are non-conductive and therefore require a trace wire. There are three significant disadvantages in the use of a trace wire. First of all, it is necessary to provide above ground access to the trace wire in order to couple the AC signal thereto. Secondly, if a break occurs in the wire (due to excavation, or natural causes such as corrosion, earth movement or burrowing animals), then the wire becomes useless. Finally, the trace wire is too thin to imprint a warning message thereon, precluding any visual warning. Additionally, a receiver cannot distinguish the trace wire from any other conductor in the vicinity.

Electronic marker systems for locating buried objects are known in the art, and generally consist of two types, namely, active and passive markers (transponders). Active markers require the use of a power supply which amplifies a signal source (usually an AC signal). The signal is radiated by the underground marker and detected by a receiver unit above ground. Passive markers, in contrast, have no power supply, but rather operate in a resonant mode, responsive to a transmitted electromagnetic field.

A passive marker is basically a wire coil and capacitor surrounded in a protective envelope, which is then buried adjacent to the cable, pipe, or other object to be located. The marker is self-contained, with no external, accessible connections. Passive markers are activated by radiating a signal into the ground in the area where the marker is expected to be found. The signal is emitted via an inductive coil held close to the surface (the transmitter portion of a transceiver). When the coil is directly over, or near, the passive marker (which is itself an inductive coil), the marker accepts energy within its bandpass and stores it, reaching a sustained amplitude during the transmission cycle. When the transmission cycle ends, the marker re-emits the energy at the marker's resonant frequency with an exponentially decaying amplitude. A second coil within the transceiver unit acts as a receiving antenna which detects the re-radiated energy, alerting the locating technician with an audible tone or other indicator means.

FIG. 1 illustrates several kinds of passive transponders for different applications. These include a small, near-surface marker 2 for locating a valve box, a medium size or mid-range marker 4 for locating a service drop (a loose coil of cabling deployed for future use), a full-range marker 6 for locating a more deeply buried conduit stub, and a so-called ball marker 8 for locating a conduit tee. The latter marker provides a spherical housing which supports the marker coil horizontally, regardless of the orientation of the housing (i.e., self-leveling), and is used for soil conditions which may result in significant shifting of the housing, such that the marker always provides a vertical location beacon (inductor axis). These markers simply "float" around the underground feature in the soil, and are subject to soil movement.

Electronic markers, as well as warning tapes, are usually color-coded according to the particular type of utility line they mark. Specifically, gas line markers are yellow; telephone cable markers are orange; waste water tunnel markers are green; water pipe markers are blue; and power supply markers are red. Similarly, the passive marker is "coded" by tuning the coil for a specific resonant frequency. Five distinct frequencies have been designated: 83.0 kHz for gas; 101.4 kHz for telephone; 121.6 kHz for sewage; 145.7 kHz for water; and 169.8 kHz for power. In this manner, a locating technician searching for, say, a gas line, cannot accidentally activate a telephone marker since his transmitter will only be sending out an 83 kHz signal, which is not within the bandwidth for a telephone marker tuned for 101.4 kHz. Of course, these frequencies have been designated by convention, and are not meant to be restrictive.

There are hybrid systems wherein, for example, a signal is applied to a buried conductor (cable or trace wire), and coupled through the conductor to one or more markers buried adjacent the conductor. Also, a marker can be used to couple one conductor to another, so that the test signal may be conveyed to the second conductor without a direct physical connection.

While passive electronic markers have several advantages over warning tapes and tracing wires, they are still subject to certain limitations, primarily related to the desired resonant frequency of a particular marker. In a prior art marker, which is essentially an LC circuit, the resonant frequency f is given by the equation $f=1/(2\pi\sqrt{LC})$ where L is the inductance of the wire coil and C is the capacitance of the capacitor. This frequency must be closely controlled in order to adhere to the foregoing tuning conventions and to provide a return signal of maximum amplitude; however, the actual frequency is affected by component construction, manufacturing tolerances, operating temperature, aging, placement and other factors.

One such problem associated with using passive or active transponders for remote identification of buried utility structures is that, if the structure is itself metallic (electrically conductive), then it will influence the detection process by causing a variance in the magnetic lines of flux from metallic sources. It is generally assumed that, to provide accurate locatability, a transponder must be separated from other metallic structures by a minimum of about four inches (10 cm) to avoid magnetic or electromagnetic interference. This effect can in particular be a problem with a service drop such as that illustrated in FIG. 1 wherein the cabling forms a conductive coil. Current methods for locating service drops are highly dependent on field crews for correct placement of transponders for accurate locating (maintaining a predetermined separation distance from the coil of wire). Even with correct placement procedures, movement can occur in a filled ditch or hole as a result of loose unpacked soil, freeze/thaw cycling, water erosion, and other causes. Interference can arise with materials in other obscured objects, such as buried closures which are used to protect splice joints and repaired cables.

In light of the foregoing, it would be desirable to devise an improved method of accurately locating a transponder, without dependency on craft skill, adjacent to a buried metallic component of a utility infrastructure, whereby any influence from the metallic component is reduced or eliminated. It would be further advantageous if the method could facilitate the protection of the component itself, such as a buried closure.

SUMMARY OF THE INVENTION

It is therefore one object of the present invention to provide an improved method of deploying an electronic transponder used to locate a buried or otherwise obscured object.

It is another object of the present invention to provide such a method that allows accurate placement of the transponder with respect to a buried utility structure, such as a splice closure.

It is yet another object of the present invention to provide an article which can be used to achieve such accurate placement of the transponder, and also provide a guard or shield for protecting the utility structure to be located.

The foregoing objects are achieved in a device for electronically marking a buried closure, comprising a transponder, a shield or cover affixed to the transponder, and means for positioning the transponder at a predetermined location and orientation with respect to the known position and orientation of the buried closure. The positioning means can include the shield, wherein the shield has a raised portion housing the transponder, and means such as tie wraps are used to secure the shield to the closure. The shield is preferably elongated and has an arcuate cross-section, wherein the cross-section of the shield is larger than a cross-section of the buried closure, and the shield is longer than the buried closure. The shield is further preferably color-coded to indicate a utility associated with the buried closure, and is constructed of a thermoplastic, injection-moldable polymer. In the implementation wherein the transponder is located within the raised portion of the shield, the raised portion provides a 311 (7.62 cm) minimum height above a wall of the buried closure. The transponder can be active or passive.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DESCRIPTION OF AN ILLUSTRATIVE EMBODIMENT

Figure 1:
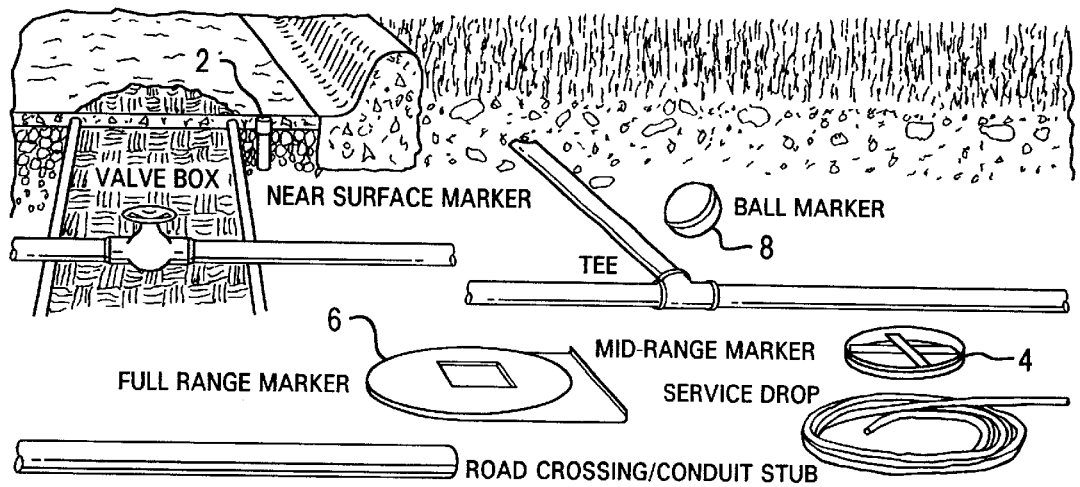
FIG. 1 is a pictorial representation of various underground utility structures which have been marked with electronic transponders to allow conventional location of the structures.
Figure 2:
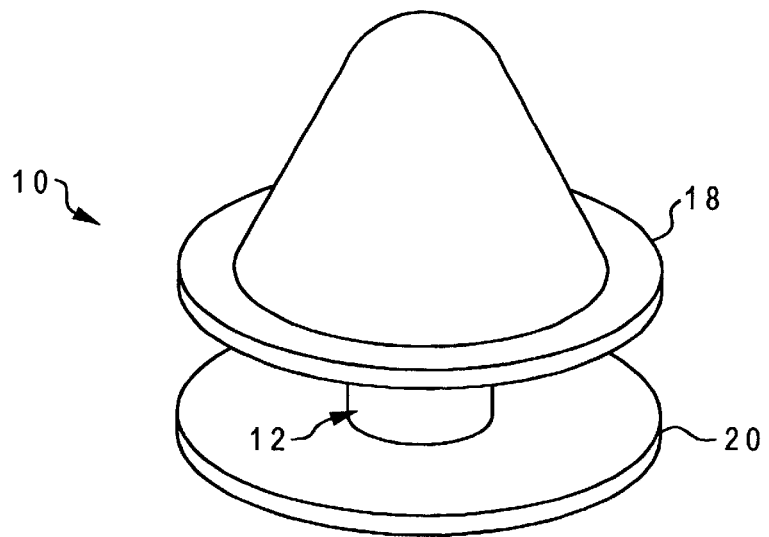
FIG. 2 is a perspective view of one embodiment of the present invention in the form of a detectable transponder reel housing.
Figure 3:
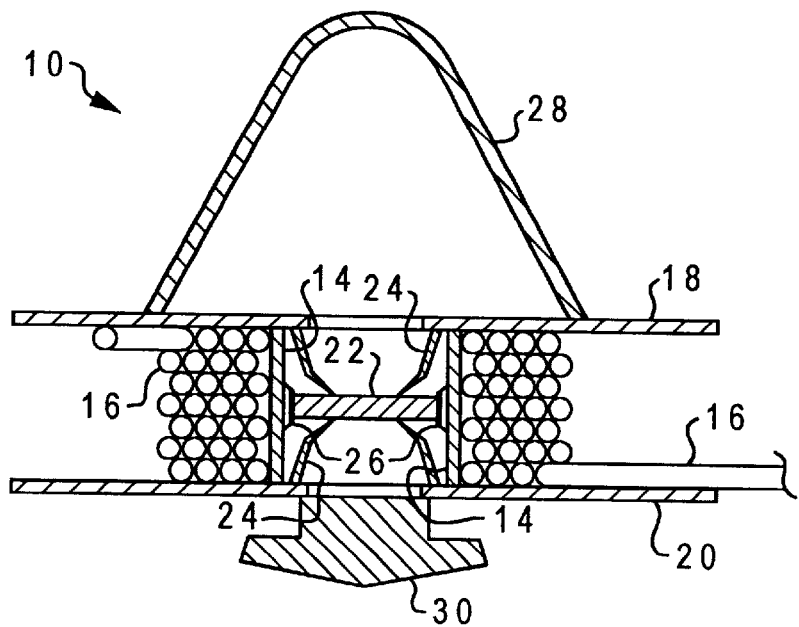
FIG. 3 is a vertical cross-section of the detectable transponder reel housing of FIG. 2.

With reference now to the figures, and in particular with reference to FIGS. 2 and 3, there is depicted one embodiment of a detectable transponder reel housing 10 constructed in accordance with the present invention. Housing 10 is generally comprised of a hub or core portion 12 defining a cylindrical wall 14 about which cabling 16 may be wound, and two discs or plates 18 and 20 which confine the cabling 16 about hub 12. Plates 18 and 20, and hub 12, may be constructed of any durable material, and are preferably integrally formed using injection molding of a polymer such as polyester or high-density polyethylene, or some polymeric blend.

Cabling 16 constitutes a service drop which can be used to provide for timely availability of cable for power, television, or telecommunications (telephony). Utility construction crews typically bury 50 to 150 feet of cable at a property line for future service hook-up for a residence or commercial establishment, so housing 10 is adapted to retain such lengths of cabling. A warning tape may optionally be wound on the reel as the predetermined amount of service drop wire is wound around hub 12.

As shown in FIG. 3, hub 12 is hollow and houses an electronic marker 22 which may be a passive transponder constructed using a capacitor connected to an inductor formed by a coil of wire. The capacitor and wire coil may be contained in a protective envelope which is then secured within hub 12. In the depiction of FIG. 3, the axis of transponder 22 is vertically oriented, and is secured in this position using a plurality of tabs or fingers 24, and an annular flange 26. In this manner, transponder 22 is isolated, or accurately positioned, with respect to cabling 16, so as to reduce or substantially eliminate any electromagnetic influence that the metallic nature of cabling 16 might otherwise cause during detection of transponder 22, which would diminish the available reflective energy used for above-ground detection and locating. A conventional transceiver may be used to detect and locate the transponder.

FIGS. 2 and 3 further illustrate two optional features of the present invention, a dome- or cone-like shield 28, and an anchor 30. Shield 28 is placed atop housing 10, and is constructed of a soft or frangible (crushable) material, such as styrene foam or paper such that, when a trencher is digging, it will "chew" through shield 28, thus visually signaling to the trenching crew the location of the service drop. Shield 28 may be brightly colored or have other warning indicia. Anchor 30 is in the shape of an upside-down mushroom, and serves to more securely hold housing 10 in place within the trench or hole, so that it is less likely to be shifted from flooding, earth settling, etc. Other means may be used to anchor housing 10, such as a stake fixture.

Figure 4:
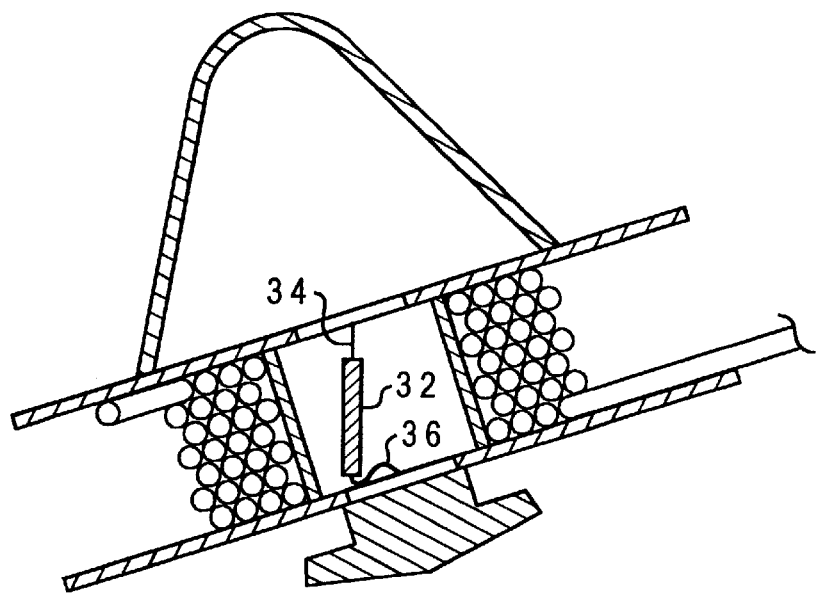
FIG. 4 is a vertical cross-section of an alternative embodiment of the detectable transponder reel housing of the present invention.

Transponder 22 could be positioned further away from cabling 16, e.g., outside the boundaries of plates 18 and 20, if necessary. Other variations in the construction of housing 10 are possible. For example, the transponder used may be of a different construction, and mounted differently within hub 12. FIG. 4 illustrates an alternative embodiment which utilizes a transponder 32 in the form of a ferrite core inductor. Ferrite core inductor 32 is further mounted within hub 12 by suspension from a wire or string 34 such that the inductor maintains a vertical orientation over a wide range of pitch angles of housing 10. A second string 36 may be provided in case the article is inverted more than 180 degrees. Those skilled in the art will appreciate that other means may be used to provide self-leveling of a transponder, such as a gimble mounted within hub 12.

Other alternative geometries include a transponder mounted on the outside of a hub, with cabling retained on the inside of the hub, wherein the transponder is again located at a sufficient separation distance from the cabling. Cabling may be wound in a figure-8 configuration, and a transponder can be located in one side (or both sides) of the figure-8 shape. Also, the hub does not need to be circular or cylindrical. This construction is, however, particularly preferable for fiber optic cabling applications, and in such applications the outer radius of the hub is most preferably greater than the minimum allowable fiber bend radius (currently about 20", or 51 cm).

Figure 5:
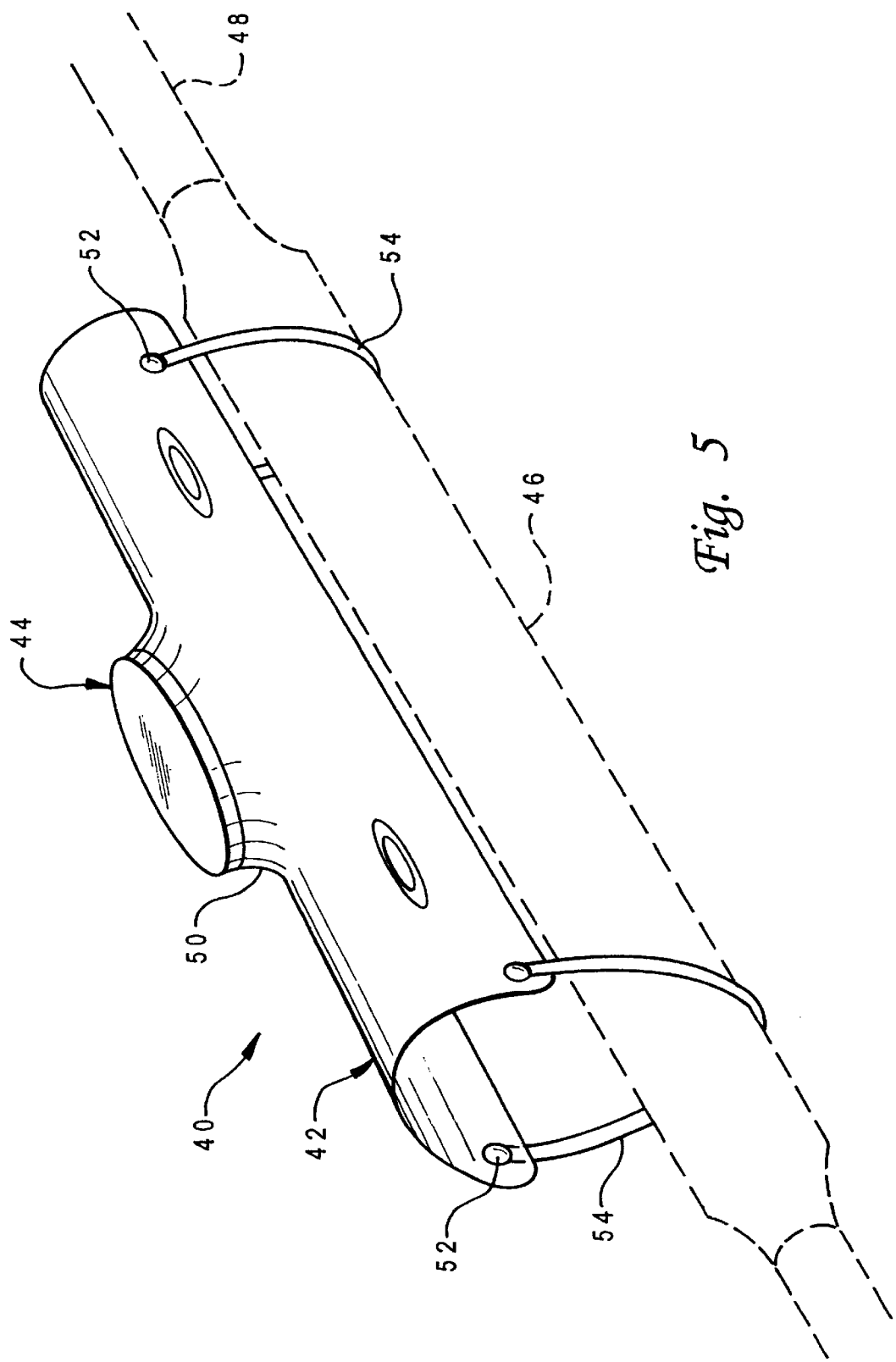
FIG. 5 is a perspective view of another embodiment of the present invention in the form of a detectable closure guard.

With further reference to FIG. 5, there is depicted a another embodiment of a detectable closure guard 40 constructed in accordance with the present invention. Closure guard 40 is generally comprised of a shield or cover portion 42 having a transponder 44 located therein. In the depicted embodiment, closure guard 40 is adapted to protect and electronically mark a closure 46 which secures a repaired or spliced portion of an underground cable 48. Cable 48 may be, e.g., fiber optic or copper wire for telecommunications, or a power (high-voltage) cable.

Shield 42 has a raised portion 50 to house and retain marker 44, and separate the marker from closure 46 by an amount, and positioned at a location, known to reduce interference that would otherwise arise with metallics or other materials of the closure. In the preferred embodiment, raised portion 50 provides a 3" (7.62 cm) minimum height above the closure wall. Other dimensions generally depend upon the application, i.e., the size (cross-section) and length of the closure. In the exemplary embodiment, shield 42 is arcuate, and guard 40 is somewhat larger than the closure in cross-section and length. Guard 40 thus further acts as an umbrella to help prevent moisture from seeping directly into the closure from above, i.e., during rainstorms or flooding.

Tie-down holes 52 may be used to conveniently anchor tie wraps 54 to secure guard 40 to the cable or closure. Tie wraps 54 prevent movement of the guard with respect to the closure, which may occur from water erosion, etc. Other means may be used to bond or affix the guard to the cable or closure. The transponder used may optionally be self-leveling.

The construction of the closure is not directly relevant, and may be in accordance with known constructions for closures or repair joints. Guard 40 may be formed of any durable material, preferably a thermoplastic (injection-moldable) polymer such as polyester or high-density polyethylene, or some polymeric blend. The transponder may be inserted into a cavity formed in the raised portion, and an upper surface of the raised portion thereafter sealed in place, e.g., with ultrasonic welding.

In addition to marking and shielding the closure, guard 40 acts as a visible anti-dig warning device. It is preferably colored according to the type of utility being marked, e.g., orange for a guard covering a closure for a telecommunications cable. This application is particularly advantageous in use with splice closures which may frequently be re-entered to provide additional branch circuits, another service, or because of later problems with the seal provided by the closure. The bright orange digging shield alerts the digger of the close proximity of the closure.

While the foregoing description contemplates a passive transponder, the invention could alternatively use an active (i.e., battery-powered), multifunction transponder.

The present invention provides a practical and effective solution to the problem associated with using either passive or active transponders for remote identification of underground utility structures, that of adverse influence from the adjacent metallic structure in the detection process. Housing 10 provides an efficient technique for utility construction crews to locate service drops without concern for transponder placement and, at the same time, provides a storage container for the utility structure. Plates 18 and 20 also present a digging shield for the coil of wire wound on the reel, as does guard 40.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. For example, while the disclosed guard is adapted for use with a cable closure, an alternative embodiment might be designed for use with a conduit joint or tee wherein the conduit is used for, e.g., water, sewage, or natural gas, with a transponder affixed thereto in such a manner as to reduce or substantially eliminate potential interference with components of the conduit. It is therefore contemplated that such modifications can be made without departing from the spirit or scope of the present invention as defined in the appended claims.

What is claimed is:

1. An article for electronically marking a buried cable closure, comprising:

a shield member having a transponder, said shield member being generally arcuate, having a cross-section larger than a cross-section of the cable closure, and a length longer than a length of the cable closure, said shield member being adapted to physically protect the cable closure and prevent moisture from seeping directly into the cable closure from above; and means for attaching the shield member to the buried cable closure such that said transponder is positioned at a predetermined location with respect to the buried cable closure.

2. The article of claim 1 wherein said attaching means includes a plurality of tie wraps.

3. The article of claim 1 wherein said shield member is color-coded to indicate a utility associated with the buried cable closure.

4. The article of claim 1 wherein said shield member is constructed of a thermoplastic, injection-moldable polymer.

5. The article of claim 1 further comprising means for self-leveling said transponder.

6. The article of claim 1 wherein said transponder is located within a raised portion of said shield member.

7. The article of claim 6 wherein said raised portion provides a 3" (7.62 cm) minimum height above a wall of the obscured structure when said shield member is attached to the obscured structure using said attaching means.

8. The article of claim 1 wherein said transponder is a passive transponder.

9. The article of claim 8 wherein said passive transponder is a ferrite core inductor.

10. A device for electronically marking a buried closure, comprising:

a transponder;

a shield member affixed to said transponder, said shield member being elongated and having an arcuate cross-section, said cross-section of said shield member being larger than a large cross-section of the buried closure, and said shield member being longer than the buried closure, said shield member further being adapted to physically protect the buried closure and prevent moisture from seeping directly into the buried closure from above; and means for positioning said transponder at a predetermined location and orientation with respect to the known position and orientation of the buried closure.

11. The device of claim 10 wherein said positioning means includes said shield member.

12. The device of claim 10 further comprising means for self-leveling said transponder.

13. The device of claim 10 wherein said shield member has a raised portion housing said transponder.

14. The device of claim 10 wherein said transponder is a passive transponder.

15. The device of claim 14 wherein said passive transponder is a ferrite core inductor.

* * * * *